United States Patent
Wang (10) Patent No.: US 9,810,403 B2
(45) Date of Patent: Nov. 7, 2017

(54) LIGHTING DEVICE AND LUMINAIRE

(71) Applicant: PHILIPS LIGHTING HOLDING B.V., Eindhoven (NL)

(72) Inventor: Lin Wang, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/117,222

(22) PCT Filed: Feb. 12, 2015

(86) PCT No.: PCT/EP2015/052936
§ 371 (c)(1),
(2) Date: Aug. 8, 2016

(87) PCT Pub. No.: WO2015/121337
PCT Pub. Date: Aug. 20, 2015

(65) Prior Publication Data
US 2016/0356457 A1    Dec. 8, 2016

(30) Foreign Application Priority Data

Feb. 12, 2014 (WO) ................ PCT/CN2014/071999
Apr. 3, 2014 (EP) .................................... 14163401

(51) Int. Cl.
*F21V 13/04* (2006.01)
*F21V 5/02* (2006.01)
(Continued)

(52) U.S. Cl.
CPC .............. *F21V 13/04* (2013.01); *F21K 9/232* (2016.08); *F21V 5/02* (2013.01); *F21V 5/045* (2013.01);
(Continued)

(58) Field of Classification Search
CPC .................................. F21V 5/045; G02B 3/08
See application file for complete search history.

(56) References Cited

U.S. PATENT DOCUMENTS 4,488,208 A    12/1984    Miller
5,676,453 A    10/1997    Parkyn, Jr. et al.
(Continued)

FOREIGN PATENT DOCUMENTS

DE    3248512 A1    7/1984
GB    1184565 A     3/1970
JP    2014006488 A  1/2014

*Primary Examiner* — Donald Raleigh
*Assistant Examiner* — Jacob R Stern (57) ABSTRACT

Disclosed is a lighting device (1) including a lens (200, 300) comprising an annular collimating structure (100) having a central axis of symmetry (202), said structure comprising a light exit surface (105) and an intermediate region (120) in between an inner region (110) proximal to said axis and an outer region (130) distal to said axis, wherein one of the inner region and outer region consists of a single prism (112) extending from the light exit surface by a first height (h1) and the other of the inner region and outer region comprises a plurality of prisms (132) extending from the light exit surface by a maximum second height (h2), wherein the first height is at least the maximum second height and the intermediate region has an intermediate region surface (120') separated from the light exit surface by a maximum further height (h3) that is smaller than the first height; and a plurality of solid state lighting elements (20) arranged in a circular pattern on a carrier surface (25) such that the solid state lighting elements are aligned with and facing the intermediate region surface (120'); and wherein the annular collimating structure is made of a material having a refractive index such that the first region is a refractive region and the single prism and the plurality of prisms each reflect light emitted by the solid state lighting elements towards the light (Continued)

exit surface. A luminaire including such a lighting device is also disclosed.

15 Claims, 7 Drawing Sheets

(51) Int. Cl.
| | | |
|---|---|---|
| *G02B 27/30* | (2006.01) | |
| *F21V 5/04* | (2006.01) | |
| *F21V 7/00* | (2006.01) | |
| *G02B 3/08* | (2006.01) | |
| *G02B 19/00* | (2006.01) | |
| *F21K 9/232* | (2016.01) | |
| *F21V 29/10* | (2015.01) | |
| *F21K 9/60* | (2016.01) | |
| *F21Y 115/10* | (2016.01) | |

(52) U.S. Cl.
CPC ............ *F21V 7/0091* (2013.01); *F21V 29/10* (2015.01); *G02B 3/08* (2013.01); *G02B 19/0028* (2013.01); *G02B 19/0061* (2013.01); *G02B 27/30* (2013.01); *F21K 9/60* (2016.08); *F21Y 2115/10* (2016.08)

(56) References Cited

U.S. PATENT DOCUMENTS

| | | |
|---|---|---|
| 8,220,975 B2 | 7/2012 | Miyashita et al. |
| 2004/0105171 A1* | 6/2004 | Minano .................... G02B 3/08 359/728 |
| 2007/0147041 A1 | 6/2007 | Shiratsuchi et al. |

* cited by examiner

LIGHTING DEVICE AND LUMINAIRE

CROSS-REFERENCE TO PRIOR APPLICATIONS

This application is the U.S. National Phase application under 35 U.S.C. §371 of International Application No. PCT/EP2015/052936, filed on Feb. 12, 2015, which claims the benefit of European Patent Application No. 14163401.4, filed on Apr. 3, 2014, and Chinese Patent Application No. PCT/CN2014/071999, filed on Feb. 12, 2014. These applications are hereby incorporated by reference herein.

FIELD OF THE INVENTION

The present invention relates to a lens, such as a lens for a lighting device comprising a solid state lighting element.

The present invention further relates to a lighting device comprising such a lens. The present invention yet further relates to a luminaire comprising such a lighting device.

BACKGROUND OF THE INVENTION

With a continuously growing population, it is becoming increasingly difficult to meet the world's energy needs as well as to kerb greenhouse gas emissions such as carbon dioxide emissions that are considered responsible for global warming phenomena. These concerns have triggered a drive towards more efficient electricity use in an attempt to reduce energy consumption.

One such area of concern is lighting applications, either in domestic or commercial settings. There is a clear trend towards the replacement of traditional incandescent light bulbs, which are notoriously power hungry, with more energy efficient replacements. Indeed, in many jurisdictions the production and retailing of incandescent light bulbs has been outlawed, thus forcing consumers to buy energy-efficient alternatives, e.g. when replacing incandescent light bulbs.

A particular promising alternative is provided by lighting devices including solid state lighting (SSL) elements, which can produce a unit luminous output at a fraction of the energy cost of incandescent light bulbs. An example of such a SSL element is a light emitting diode.

A problem hampering the penetration of the consumer markets by such lighting devices is that it is far from trivial to control the shape of the light output of such devices, at least in a cost-effective manner. This is a particular problem when a highly directional light output is required, e.g. a light bulb having a high degree of collimation or small beam angle, e.g. a beam angle of less than 30°.

Figure 1:
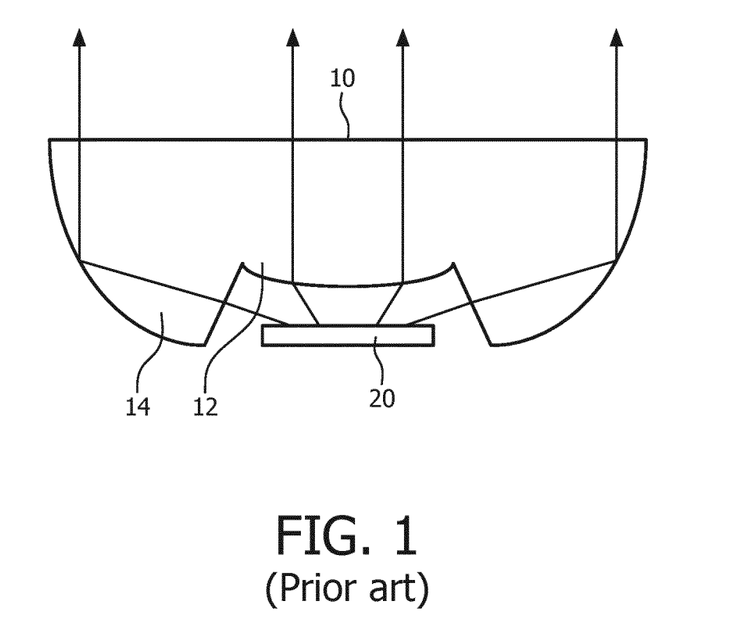
FIG. 1 schematically depicts a cross-section of a prior art collimating lens.

Such beam angles can be controlled by the inclusion of collimating lenses into the lighting device. FIG. 1 schematically depicts a cross-section of a prior art collimating lens 10 for collimating the luminous output of a SSL element 20. The collimating lens 10 comprises a central refractive portion 12 surrounded by a total internal reflection prism 14 with the SSL element 20 being centred relative to and opposite the central refractive portion 12.

Such a collimating lens 10 is known to give good collimation results, although a drawback of this lens is that it can become relatively bulky especially when a high degree of collimation of the luminous output of the SSL element 20 is required. This is because the amount of required lens material is inversely related to the beam angle to be achieved. This can be particularly problematic in lighting devices requiring multiple SSL elements to achieve the desired luminous output, as the size of the collimating lens 10 imposes a physical limit on the number of SSL element/collimating lens pairs that can be fitted within the confines of the lighting device. This is particularly relevant when the lighting devices are light bulbs.

Figure 2:
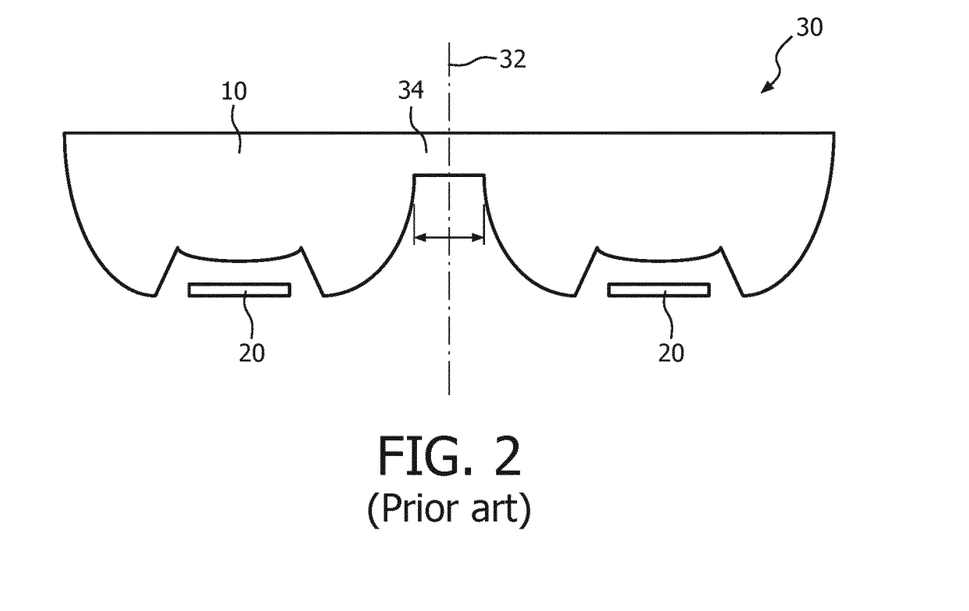
FIG. 2 schematically depicts a cross-section of a prior art doughnut lens.

In order to address this problem, so-called doughnut lenses have been proposed such as the doughnut lens 30, a cross-section of which is schematically depicted in FIG. 2, which essentially contains the collimating lens 10 in annular form around an aperture 34 of the doughnut lens 30. In other words, the collimating lens 10 is centred on a central axis of symmetry 32. Such a doughnut lens 30 may be used in combination with a circular pattern of SSL elements 20, with each SSL element 20 being centred relative to the central refractive portion 12 of the collimating lens portion 10 as previously explained.

This has the advantage that a single collimating lens, i.e. the doughnut lens 30, can be used in conjunction with a plurality of SSL elements 20, which therefore provides a more compact solution compare to a solution in which each SSL element 20 is provided with a separate (circular) collimating lens 10. However, a large volume occupied by the doughnut lens 30 is occupied by the aperture 34, i.e. the doughnut lens 30 tends to have a relatively large aperture 34, which therefore compromises the collimation performance of this lens.

Figure 3:
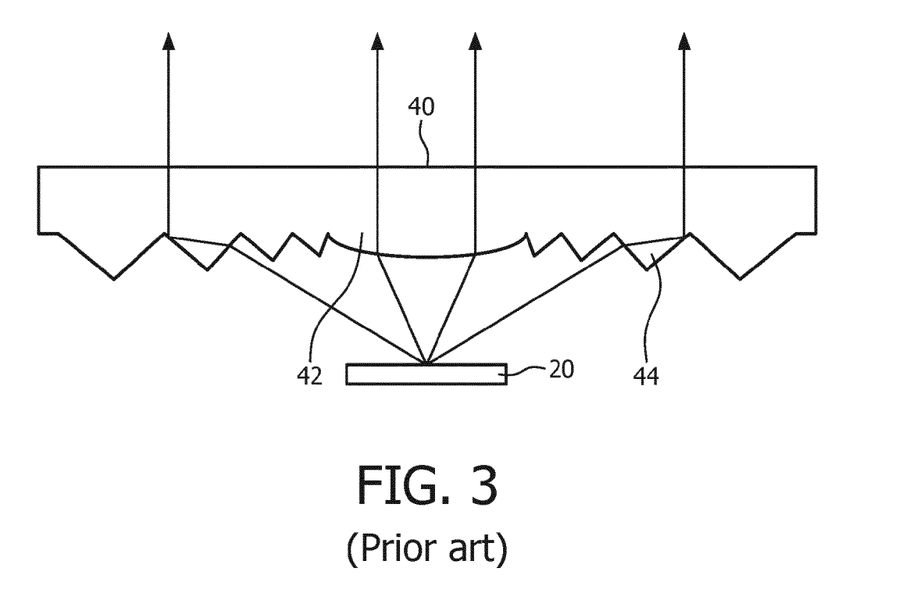
FIG. 3 schematically depicts a cross-section of a prior art Fresnel-type lens.

FIG. 3 schematically depicts a cross-section of another well-known collimating lens 40, which is a Fresnel-type lens comprising a central refractive portion 42 and a plurality of annular prisms 44 around the central refractive portion 42, which annular prisms tend to increase in size in an outward direction (in a direction from the central refractive portion 42 towards the outer edge of the collimating lens 40). As before, the SSL element 20 is centred relative to and opposite the refractive lens portion 42. An example of such a lens is for instance disclosed in U.S. Pat. No. 8,220,975 A1. Such Fresnel-type lenses 40 are more compact than the collimating lenses 10 and allow for a greater area to be used for collimation without increasing the height of the lens. However, the relatively large lateral dimensions of Fresnel-type lenses may make it difficult to form a laterally compact doughnut lens that still achieves sufficient degrees of collimation.

SUMMARY OF THE INVENTION

The present invention seeks to provide a lighting device comprising multiple solid state lighting elements and a lens that achieves a high degree of collimation.

The present invention yet further seeks to provide a luminaire comprising such a lighting device.

According to an aspect, there is provided a lighting device including a lens comprising an annular collimating structure having a central axis of symmetry, said structure comprising a light exit surface and an intermediate region in between an inner region proximal to said axis and an outer region distal to said axis, wherein one of the inner region and outer region consists of a single prism extending from the light exit surface by a first height and the other of the inner region and outer region comprises a plurality of prisms extending from the light exit surface by a maximum second height, wherein the first height is at least the maximum second height and the intermediate region has an intermediate region surface separated from the light exit surface by a maximum further height that is smaller than the first height; and a plurality of solid state lighting elements arranged in a circular pattern on a carrier surface such that the solid state lighting elements are aligned with and facing the intermediate region surface; and wherein the annular collimating structure is made of a material having a refractive index such that the first region is a refractive region and the single prism and the plurality of prisms each reflect light emitted by the solid state lighting elements towards the light exit surface.

The present invention is based on the realization that a lighting device with more efficient collimating characteristics can be achieved by providing such a lens with an asymmetric annular collimating structure, in which an inner reflective region and outer reflective region have a different number of prisms, e.g. a large donut-like prisms and a plurality of total internal reflection prisms. Consequently, the volume occupied by such a lens can be more effectively filled with lens material contributing to the collimation achieved by the lens, which facilitates the improved collimation efficiency of the lens and provides a more compact lighting device due to the fact that the ring of SSL elements can be placed within or close to the cavity defined by the single prism having the first height and optionally the plurality of prims in case the second height equals the first height. This ensures that the compact lighting device has excellent optical efficiency and improved luminous peak power due to improved collimation characteristics compared to prior art lighting devices.

Preferably, the solid state lighting elements are spaced from the light exit surface by a distance not exceeding the first height such that the luminous distribution of the SSL elements, which typically exhibits a 180° spread as is well-known per se, is fully captured by the lens due to the fact that the SSL elements are aligned with or within the aforementioned cavity. This therefore maximizes luminous efficiency.

The single prism may have a first surface portion arranged to receive light emitted by the solid state lighting elements and a second curved surface portion arranged to reflect light received by the first surface portion towards the light exit surface. It has been found that such a curved reflective surface is particularly suitable to achieve the desired degree of collimation with a compact prism or facet.

In an embodiment, the second curved surface portion is shaped such that at least 50% of the light received by the first surface portion is reflected towards the light exit surface in order to achieve particularly good optical performance.

Each of the plurality of prisms may comprise a first surface portion arranged to receive light emitted by the solid state lighting elements and a second surface portion arranged to reflect light received by the first surface portion towards the light exit surface. The prisms for instance may be Fresnel-type facets. Preferably, the prisms of said plurality are increasing in height in a direction away from the circular pattern of solid state elements such that the prism distal to said circular pattern has said maximum second height. This may promote a more homogeneous luminous output of the lighting device due to the fact that the prisms each may collect a particular range of beam angles emitted by the SSL elements, wherein the height of each prism may be chosen such that each prism collects approximately the same amount of light.

In an embodiment, the inner region consists of the single prism. This is for instance a suitable embodiment if the lens is to collimate the luminous output of a relatively small number of SSL elements of the lighting device, because the refractive region of the lens opposite which such SSL elements are typically placed in a circular fashion is located closer to the centre of the lens than to its edge. This allows for a larger number of prisms in the outer region of the lens, which therefore improves the collimation of light directed towards the outer edge of the lens and exiting the SSL elements under relatively shallow angles with the luminous surface of the SSL elements. Such a lens may be considered a hybrid of a traditional collimating lens such as the collimating lens 10 and a Fresnel-type lens, e.g. a Fresnel-type lens 40. To this end, the single prism may have a height exceeding the height of each prism in the outer reflective region. The relatively large amount of material in the single prism facilitates a good degree of collimation by the inner reflective region of the lens.

In an alternative embodiment, the outer region consists of the single prism. This is for instance a suitable embodiment if the lens is to collimate the luminous output of a relatively large number of SSL elements of the lighting device, because the refractive region of the lens opposite which such SSL elements are typically placed in a circular fashion is located further away from the centre of the lens than from its edge, thereby increasing the radius of the circular pattern of SSL elements and facilitating a larger number of SSL elements to be placed in this circular pattern. This allows for a larger number of prisms in the inner region of the lens, which therefore improves the collimation of light directed towards the centre of the lens and exiting the SSL elements under relatively shallow angles with the luminous surface of the SSL elements. Again, such a lens may be considered a hybrid of a traditional collimating lens such as the collimating lens 10 and a Fresnel-type lens, e.g. a Fresnel-type lens 40. To this end, the single prism may have a height exceeding the height of each prism in the inner reflective region. The relatively large amount of material in the single prism facilitates a good degree of collimation by the outer reflective region of the lens.

The single prism and the plurality of prisms preferably are total internal reflection (TIR) prisms to maximize the luminous efficiency and collimation of the lighting device.

The material may be a polymer such as polycarbonate (PC), poly (methyl methacrylate) (PMMA) and polyethylene terephthalate (PET), as such polymer materials have excellent optical properties and allow for a straightforward manufacture of the lens of the lighting device in a cost-effective manner, e.g. by moulding.

The light exit surface of the lens may be a smooth, e.g. flat or curved surface. Alternatively, the light exit surface may comprise beam shaping elements, e.g. micro lenses, scattering elements and the like to further shape the luminous output of the lighting device.

In an embodiment, the lighting device is a light bulb. Non-limiting examples of suitable bulb sizes include but are not limited to MR11, MR16, GU4, GU5.3, GU6.35, GU10, AR111, Par20, Par30, Par38, BR30, BR40, R20, R50 light bulbs and so on.

In accordance with another aspect of the present invention, there is provided a luminaire comprising the lighting device according to an embodiment of the present invention. Such a luminaire may for instance be a holder of the lighting device or an apparatus into which the lighting device is integrated.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale.

It should also be understood that the same reference numerals are used throughout the Figures to indicate the same or similar parts.

In the context of the present application, a prism is a multi-faceted body or protrusion comprising at least one surface or facet for refracting incident light towards at least one other surface or facet for reflecting the refracted light received by the at least one surface in a desired direction. As is known per se, such a desired reflection may be achieved by controlling the shape of these surfaces of facets. In at least some embodiments, the at least one other surface or facet achieves total internal reflection. It is noted that such prisms are sometimes also referred to as facets, e.g. when referring to Fresnel-type lenses and collimators.

Figure 4:
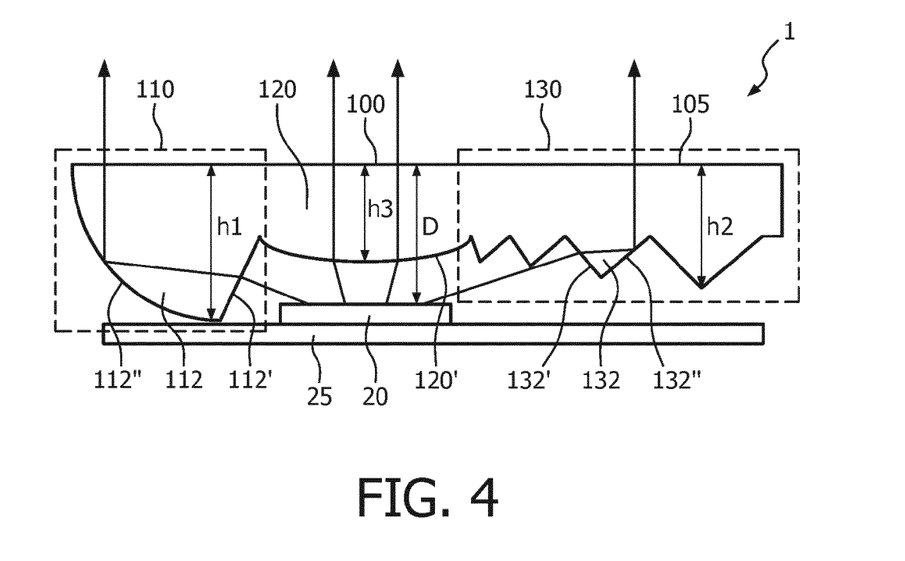
FIG. 4 schematically depicts a cross-section of an aspect of a lighting device including a collimating lens according to an embodiment of the present invention.

FIG. 4 schematically depicts an aspect of a lighting device including a collimating lens according to an embodiment of the present invention. FIG. 4 schematically depicts a cross-section of a collimating structure 100 of a lens such as a doughnut lens, which collimating structure 100 may be shaped as an annulus or ring around the central region of the lens to form a symmetrical doughnut lens having an asymmetrical collimating portion 100 as will be explained in more detail with the aid of FIG. 5.

In the context of the present application, a doughnut lens may be any lens that has a circular shape and comprises an annular collimating structure 100 around a central portion of non-zero area. The central portion may be an aperture of the doughnut lens or may be formed of a material such as the same material that also forms the annular collimating structure 100.

The collimating structure 100 has an inner reflective region 110 comprising a first number of reflective prisms 112, an outer reflective region 130 comprising a second number of reflective prisms 132 and a refractive region 120 in between the inner reflective region 110 and the outer reflective region 130. A light source such as a solid state lighting (SSL) element 20 is typically placed opposite the centre of the refractive region 120 such that the collimating structure 100 collimates the luminous output emanating from the SSL element 20 as indicated by the single arrows in FIG. 4. The surface of the refractive region 120 facing the SSL element 20 may have any suitable shape. In an embodiment, the refractive region 120 has a convex surface facing the SSL element 20 although it should be understood that other surface shapes may be contemplated, such as for instance a refractive multi-faceted surface.

In the context of the present application, where reference is made to an inner reflective region 110, this region is located in between a central portion of a doughnut lens and the refractive region 120, i.e. proximal to the symmetry axis 202, whereas where reference is made to outer reflective region 130, this region is located between the refractive region 120 and the periphery of such a doughnut lens, i.e. distal to the symmetry axis 202.

The inventors have realized that the annular collimating structure 100 of a doughnut lens does not have to be symmetrically shaped in order to obtain good collimation results when used in a lighting device 1 comprising a plurality of SSL elements 20, e.g. LEDs. More particularly, it has been realized that by having a different number of reflective elements on either side of the refractive region 120 of such an annular collimating structure 100, more efficient use of the available volume in which a doughnut lens including the annular collimating structure 100 can be made, thereby improving the collimation efficiency of the lens. Specifically, by combining a region with a single doughnut-like prism and a region with a plurality of Fresnel-type prisms, a lighting device 1 comprising a compact lens with particularly good collimation efficiency can be achieved, thereby providing a lighting device 1 that can produce collimated light intensities superior to existing SSL element-based lighting devices comprising the same number of SSL elements. In other words, the lighting device 1 according to embodiments of the present invention may achieve a desired collimated light intensity with fewer SSL elements than prior art like devices, thereby improving energy efficiency and facilitating easier thermal management of the lighting device 1.

Furthermore, a lighting device 1 including such a lens makes it possible for the number of SSL elements 20 to be arranged in a circular pattern in which the spacing between the SSL elements 20 is optimized. Such optimization may for instance seek to strike a balance between effective dissipation of the heat generated by the SSL elements 20, which becomes easier if the SSL elements 20 are spaced further apart, and avoiding the appearance of spots in the luminous output of such a lighting device, which spots may appear if the luminous output of individual SSL elements 20 is not effectively mixed, which can be avoided by placing the individual SSL elements 20 in close vicinity of each other.

The diameter of the resulting optimized circular pattern of the SSL elements 20 may be used to define the location of the refractive region 120 of the annular collimating structure 100, as the refractive region 120 is typically placed opposite the SSL elements 20 such that the SSL elements 20 are centred relative to the refractive region 120. The thus determined location of the refractive region 120 may be used to optimize the collimating function of the inner reflective region 110 as a function of the available space in between the refractive region 120 and the central portion of the lens. Such an optimization may involve defining the shape of reflective prism 112 in the inner reflective region 110. The thus determined location of the refractive region 120 may further be used to optimize the collimating function of the outer reflective region 130 as a function of the available space in between the refractive region 120 and the periphery of the lens. Such an optimization may involve defining the appropriate number of reflective prisms 132 in the outer reflective region 110.

In FIG. 4, the inner reflective region 110 comprises a single reflective prism 112 extending from a light exit surface 105, whereas the outer reflective region 130 comprises a plurality of reflective prisms 132 extending from the light exit surface 105. The single reflective prism 112 of the inner reflective region 110 may have a height h1 (as measured from the light exit surface 105 to the extremity of the single reflective prism 112 opposite this light exit surface) that is greater than the height of any of the reflective prisms 132 of the outer reflective region 130, i.e., greater than the maximum height h2 of the reflective prisms 132 (as measured from the light exit surface 105 to the furthest extremity of any of the reflective prisms 132 opposite this light exit surface). The additional material in the single reflective prism 112 facilitates a greater degree of collimation by the single prism as previously explained, such that the inner reflective region 110 and the outer reflective region 130 both can achieve good degrees of collimation, in particular when the available volume in the outer reflective region 130 is occupied by a plurality of reflective prisms 132.

For instance, the inner reflective region 110 may comprise a reflective prism 112 shaped as a prism of a collimator such as the collimator 10, whereas the outer reflective region 130 may comprise a plurality of prisms 132 defining a Fresnel-type collimating structure.

The single prism 112 typically comprises a first surface portion 112' acting as a light entry surface for the light emitted by the SSL elements 20 and a second surface portion 112" acting as a reflective surface portion that reflects the light that has entered the single prism through the light entry surface towards the light exit surface 105 from which the single prism 112 extends. Preferably, the second surface portion 112" is curved, i.e. convex, in order to optimise collimation characteristics of the collimating structure 100. The curvature of the second surface portion 112" is preferably chosen such that at least 50% of the light entering the single prism 112 through the first surface portion 112' is reflected towards the light exit surface 105.

In an embodiment, the plurality of prisms 132 in the outer region 130 are increasing in height such that the prism proximal to the SSL elements 20 has the smallest height and the prism distal to the SSL elements 20 has the largest height, i.e. maximum height h2. This may assist a homogeneous luminous output of the lighting device 1 due to the fact that each prism 132 collects roughly the same amount of light emitted by the SSL elements 20 under different beam angles. Each of the prisms 132 may have a first surface portion 132' facing the SSL elements 20 acting as a light entry surface for the light emitted by the SSL elements 20 and a second surface portion 132" acting as a reflective surface portion that reflects the light that has entered the single prism through the light entry surface towards the light exit surface 105 from which the single prism 112 extends.

Intermediate region 120, which is located in between the in the region 110 and the outer region 130 opposite which the SSL elements 20 are located, typically comprises an intermediate surface 120' facing the SSL elements 20, which intermediate surface acts as the light entry surface for some of the light emitted by the SSL elements 20. The intermediate region 120 typically is a refractive region to aid the overall collimation of the light emitted by the lighting device 1. In an embodiment, the intermediate surface 120' has a curved, preferably a convex, shape to achieve the desired degree of collimation. The intermediate region 120 has a maximum height h3 that is smaller than the maximum height h1 of the single prism 112 such that a recess or cavity is formed under the intermediate region 120 in which the SSL elements 20 may be placed or located to maximize the luminous efficiency of the lighting device 1 as will be explained in further detail below.

Figure 5:
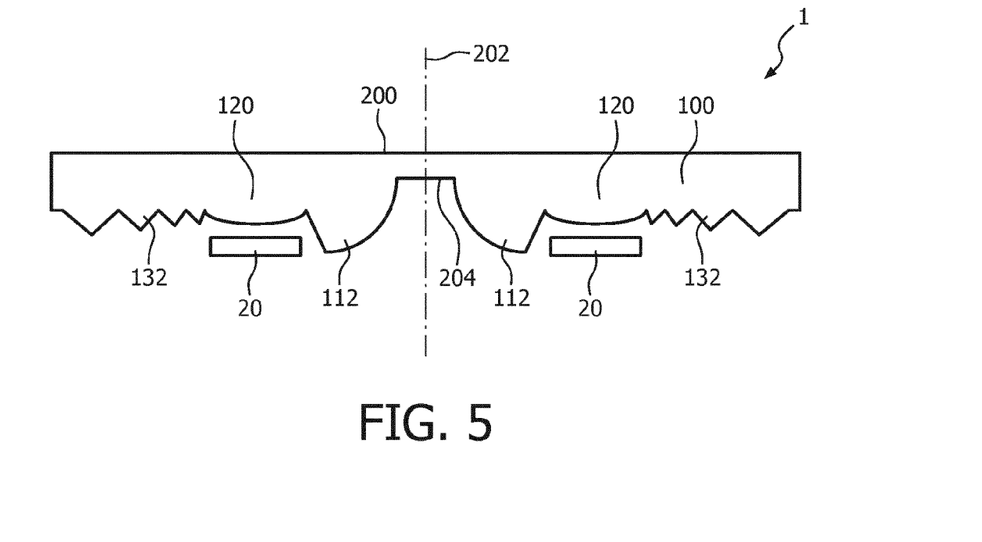
FIG. 5 schematically depicts a cross-section of a lighting device including a collimating lens according to an embodiment of the present invention.

FIG. 5 schematically depicts a cross-section of an aspect of a lighting device 1 comprising a plurality of SSL elements 20 arranged in a circular pattern and a doughnut lens 200 comprising an annular collimating structure 100 as shown in FIG. 4. The annular collimating structure 100 is centred on symmetry axis 202 and the central region 204 of the doughnut lens 200, which central region 204 may be an aperture in the lens 200 or a portion of material such as the lens material as previously explained. The SSL elements 20 may be mounted on a carrier 25, e.g. a printed circuit board or the like.

In a particularly advantageous embodiment, the light exit surfaces of the SSL elements 20 are separated from the light exit surface 105 of the lens 100 by a distance D that does not exceed and preferably is smaller than the height h1 of the single prism 112. This ensures that virtually all light emitted by the SSL elements 20 is harvested by the lens 100, thereby improving the luminous efficiency of the lighting device 1, in particular when the maximum height h2 of the plurality of prisms 132 approaches the height h1. It should however be understood that the distance D may exceed the height h1 by a small amount, e.g. about 10%, for instance if a trade-off is required between the thermal performance of the lighting device 1 and its optical efficiency, for instance to prevent overheating of the doughnut lens 200 and/or the SSL elements 20. Nevertheless, it should be understood that it is preferable that this distance D is minimized as much as possible without compromising thermal performance of the lighting device 1.

In an embodiment, the maximum height h2 may equal the maximum height h1 such that the single prism 112 and the largest of the plurality of prisms 132 may support the doughnut lens 200 on a receiving surface, which may be the carrier 25 or another surface of the lighting device 1.

In FIGS. 4 and 5, the light exit surface 105 is shown as a smooth, e.g. planar, surface by way of non-limiting example only. It should be understood that the light exit surface 105 may further comprise optical elements, e.g. beam shaping elements such as micro lenses, scattering elements or other diffusing elements, and so on if so desired, for instance to obscure the SSL elements 20 from direct view.

Figure 6:
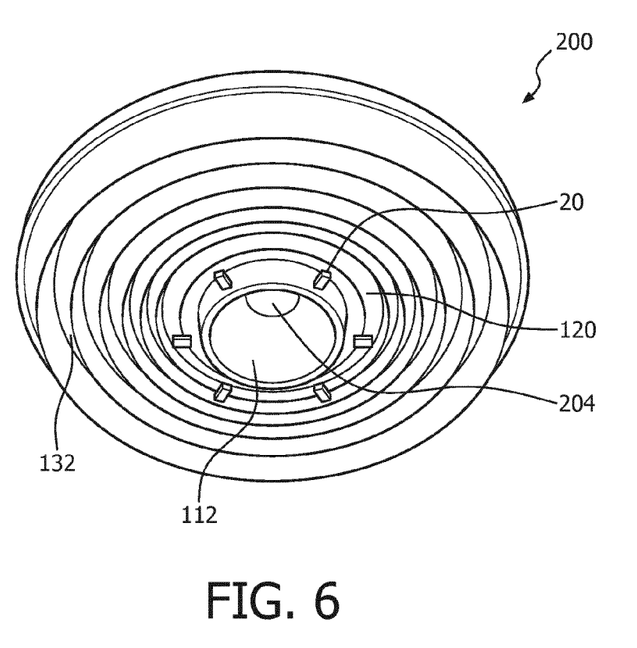
FIG. 6 schematically depicts a perspective view of an aspect of the lighting device of FIG. 5.

FIG. 6 schematically depicts a perspective view of the lighting device 1 including the doughnut lens 200 and the arrangement of the SSL elements 20 in a circular pattern relative to the refractive region 120 in between the inner prism 112 and the outer prisms 132 of the doughnut lens 200.

The arrangement shown in FIG. 5 and FIG. 6 is particularly suitable if the lighting device 1 includes a relatively small number of SSL elements 20 (six SSL elements 20 are shown in FIG. 6 by way of non-limiting example), such that a circular pattern of the SSL elements 20 has a small diameter, i.e. is located relatively close to the central axis 202. As can be seen in FIG. 6 in particular, the asymmetric nature of the annular collimating structure 100 of the doughnut lens 200 allows for an efficient use of the majority of the surface area of the doughnut lens 200 for collimating purposes. It can be immediately recognized that a symmetrical collimator, i.e. comprising a single inner prism 112 and a single outer prism being a mirror image of the inner prism 112, would occupy a much smaller area of the doughnut lens, such that collimation efficiency would be reduced as will be demonstrated in more detail below.

At this point, it is noted that the lighting device 1 typically will comprise many more components, such as a housing, light exit window, driver circuitry for the SSL elements 20 and so on. However, these components may be conventional components that are irrelevant to the teachings of the present application such that these components have been omitted from the drawings in the present application for the sake of clarity.

Figure 7:
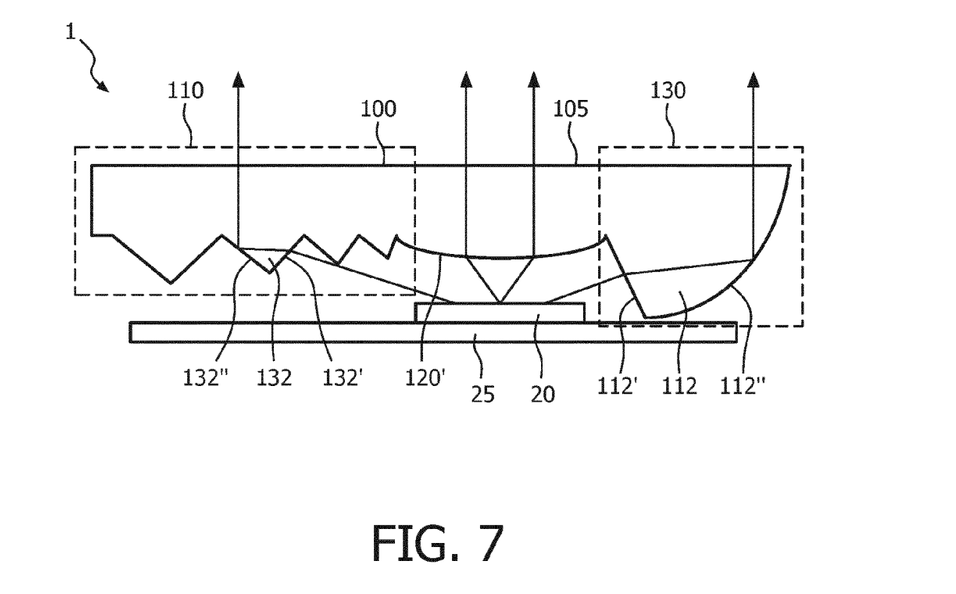
FIG. 7 schematically depicts a cross-section of an aspect of a lighting device including a collimating lens according to an alternative embodiment of the present invention.
Figure 8:
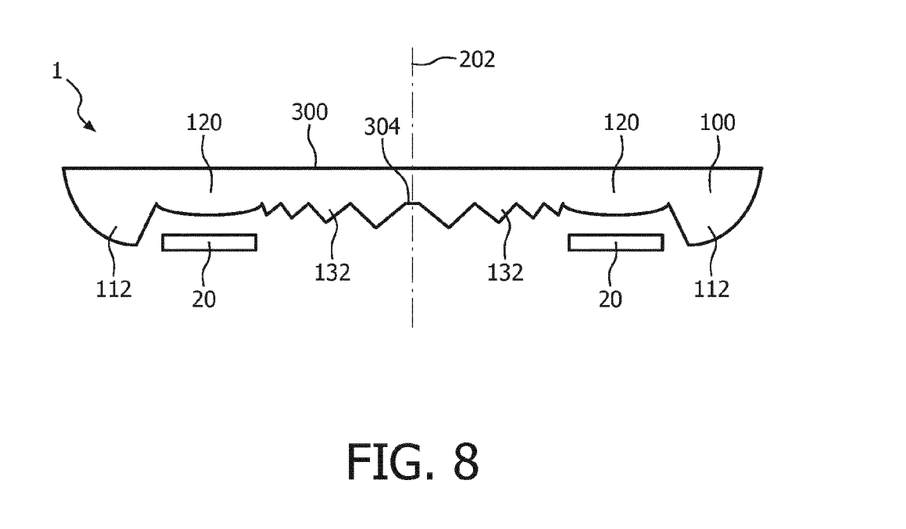
FIG. 8 schematically depicts a cross-section of a lighting device including a collimating lens according to an alternative embodiment of the present invention.

However, some lighting devices 1 may require the integration of a larger number of SSL elements 20, such that the circular pattern of these SSL elements 20 has a diameter such that the SSL elements 20 are located closer to the periphery of the doughnut lens than to its central portion. FIG. 7 schematically depicts a cross-section of an annular collimating portion 100 of a lighting device 1 including a doughnut lens 300 that may be used in such a scenario. A cross section of the doughnut lens 300 is schematically depicted in FIG. 8. In this embodiment, the inner reflective region 110 comprises the previously described plurality of reflective prisms 132 and the outer reflective region 130 comprises the previously described single reflective prism 112. As before, the single reflective prism 112 has a height h1 that is at least as large as or preferably larger than the height of each of the reflective prisms 132 (i.e. at least as large or larger than the maximum height h2) to facilitate a good degree of collimation in the outer reflective region 130. As before, a refractive region 120 is located in between the inner reflective region 110 and the outer reflective region 130, wherein the refractive region 120 may have an intermediate surface 120' facing the SSL elements 20 that may have any suitable shape, such as a convex shape as previously explained. As before, the maximum height h3 of the intermediate region 120 is smaller than the height h1 of the single prism 112 such that by placement of the SSL elements 20 in close vicinity to the intermediate surface 120', the SSL elements 20 may be located within the doughnut lens 300 in order to maximize luminous efficiency as previously explained.

Figure 9:
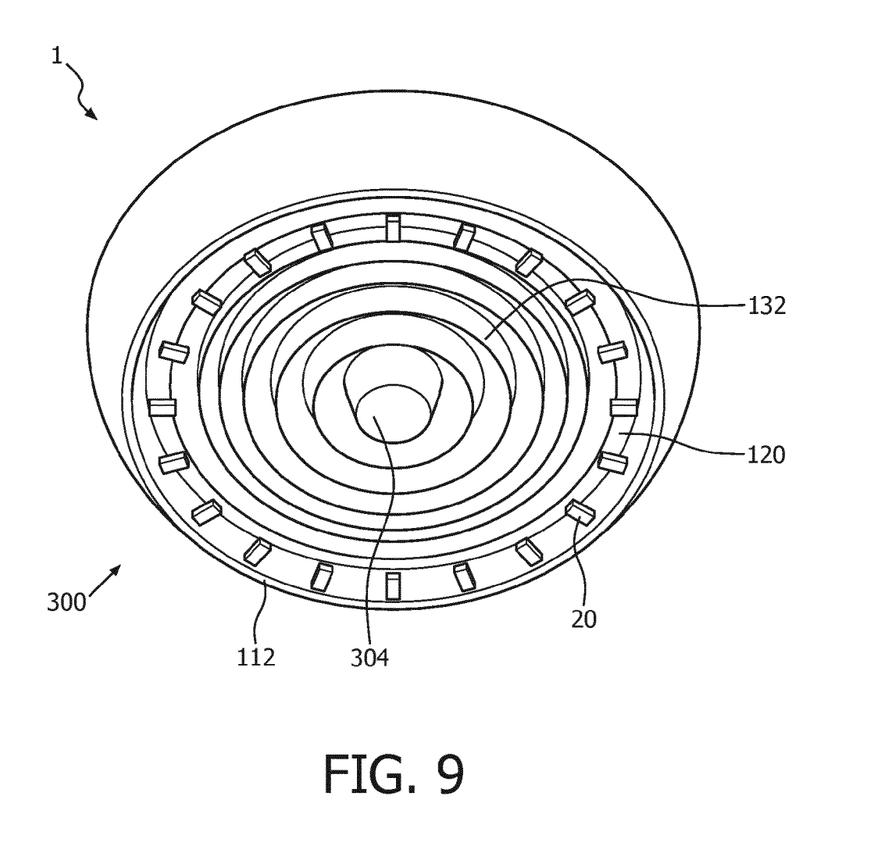
FIG. 9 schematically depicts a perspective view of an aspect of the lighting device of FIG. 8.

FIG. 8 schematically depicts a cross-section of an aspect of a lighting device 1 comprising a plurality of SSL elements 20 arranged in a circular pattern and a doughnut lens 300 comprising an annular collimating structure 100 as shown in FIG. 7. The annular collimating structure 100 is centred on symmetry axis 202 and the central region 304 of the doughnut lens 300, which central region 304 may be an aperture in the lens 300 or a portion of material such as the lens material as previously explained. FIG. 9 schematically depicts a perspective view of the doughnut lens 300 and the arrangement of the SSL elements 20 in a circular pattern relative to the refractive region 120 in between the inner prisms 112 and the outer prism 132 of the doughnut lens 300. The lighting device 1 comprises twenty SSL elements 20 by way of non-limiting example.

The arrangement shown in FIG. 8 and FIG. 9 is particularly suitable if the lighting device 1 includes a relatively large number of SSL elements 20, such that an optimized circular pattern of the SSL elements 20 has a relatively large diameter, i.e. is located relatively close to the periphery of the doughnut lens 300. As can be seen in FIG. 9 in particular, the asymmetric nature of the annular collimating structure 100 of the doughnut lens 300 allows for an efficient use of the majority of the surface area of the doughnut lens 300 for collimating purposes. It can be immediately recognized that a symmetrical collimator, i.e. comprising a single outer prism 132 and a single inner prism being a mirror image of the outer prism 132, would occupy a much smaller area of the doughnut lens 300, such that collimation efficiency would be reduced as will be demonstrated in more detail below.

Figure 10:
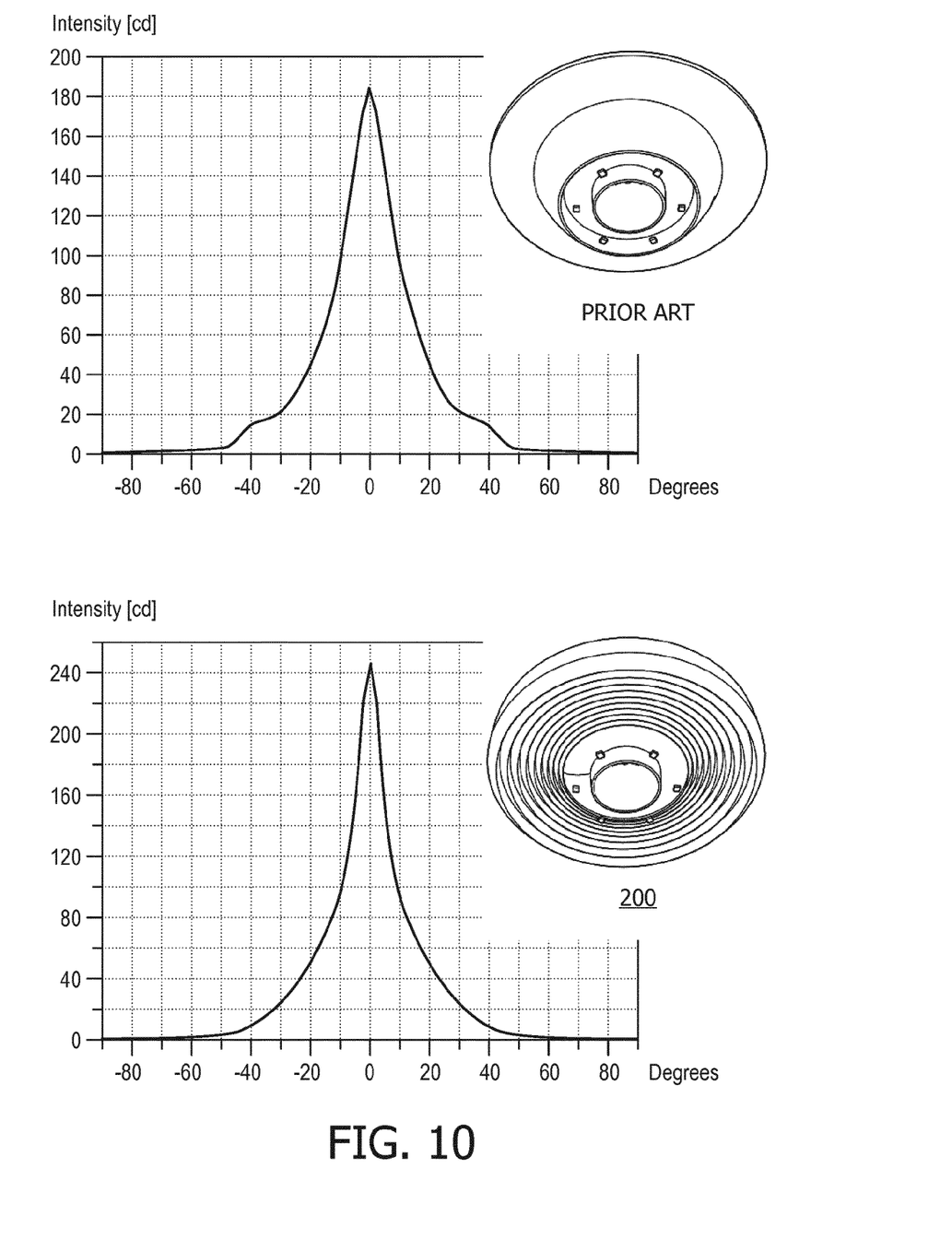
FIG. 10 depicts a luminous intensity distribution of the lighting device of FIG. 6 and a prior art lighting device.

FIG. 10 shows the simulated luminous intensity distribution produced by a lighting device including a conventional doughnut lens and the lighting device 1 including the doughnut lens 200 shown in FIG. 6. The luminous intensity distributions are shown relative to the central axes of these lenses, e.g. central axis 202 of the doughnut lens 200. The conventional doughnut lens has been created by providing a symmetrical annular collimating structure in which the Fresnel-type outer collimation region of the doughnut lens 200 is replaced by the mirror image of the inner prism 112 as previously explained. It will be immediately apparent from FIG. 10 that this yields a conventional doughnut lens comprising a void peripheral region, i.e. a region that does not contribute to the collimation of the light generated by the SSL elements 20 in the circular pattern opposite the refractive region 120. In contrast, in the lighting device 1 including the doughnut lens 200, such a void region is not present because the Fresnel-type outer collimation region extends to the outer edge of the doughnut lens 200.

As can be seen from the simulated luminous intensity distributions, the inventive lighting device 1 including the doughnut lens 200 produces a more sharply defined luminous distribution with significantly increased peak intensity; the peak intensity of the luminous output produced by the inventive doughnut lens 200 is around 250 lm, whereas the conventional doughnut lens facing the same number and type of SSL elements 20 as the doughnut lens 200 produces a peak intensity of around 180 lm. This clearly demonstrates that the asymmetric annular collimating region 100 of the doughnut lens 200 significantly increases collimation efficiency compared to conventional doughnut lenses having a symmetrical collimating region.

Figure 11:
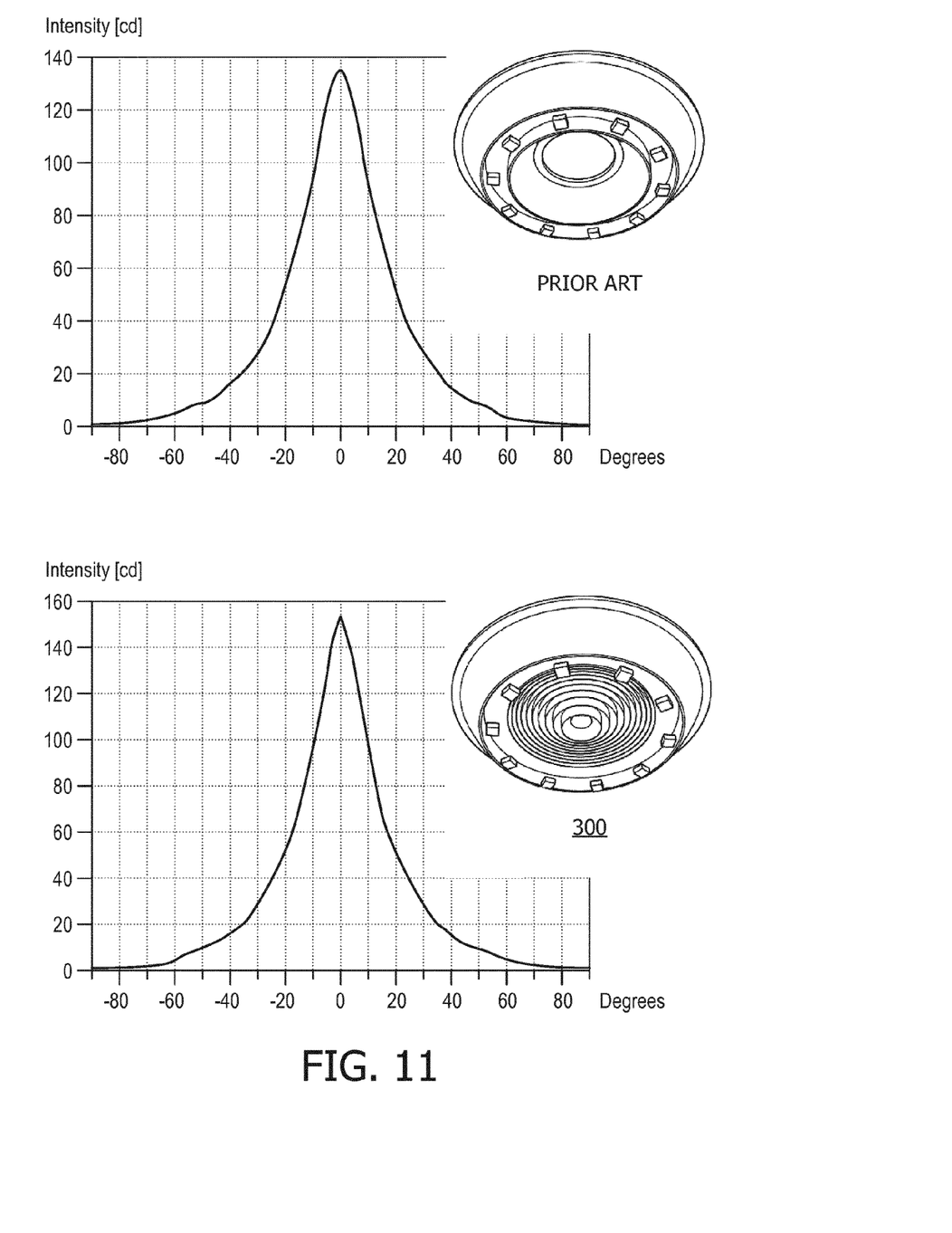
FIG. 11 depicts a luminous intensity distribution of the lighting device of FIG. 9 and a prior art lighting device.

FIG. 11 shows the simulated luminous intensity distribution produced by a lighting device including a conventional doughnut lens and the inventive lighting device 1 including the doughnut lens 300 shown in FIG. 9. The luminous intensity distributions are shown relative to the central axes of these lenses, e.g. central axis 202 of the doughnut lens 300. The conventional doughnut lens has been created by providing a symmetrical annular collimating structure in which the Fresnel-type inner collimation region of the doughnut lens 300 is replaced by the mirror image of the outer prism 112 as previously explained. It will be immediately apparent from FIG. 11 that this yields a conventional doughnut lens comprising a large central aperture that does not contribute to the collimating function of the lens. In contrast, in the doughnut lens 300, such a large aperture is not present because the Fresnel-type outer collimation region extends to the outer edge of the doughnut lens 200.

As can be seen from the simulated luminous intensity distributions, the inventive lighting device 1 including the doughnut lens 300 produces a more sharply defined luminous distribution with significantly increased peak intensity; the peak intensity of the luminous output produced by the inventive doughnut lens 300 is around 155 lm, whereas the conventional doughnut lens facing the same SSL elements 20 as the doughnut lens 300 produces a peak intensity of around 135 lm. This clearly demonstrates that the asymmetric annular collimating region 100 of the doughnut lens 300 of the lighting device 1 significantly increases collimation efficiency compared to conventional doughnut lenses having a symmetrical collimating region with a (relatively large) central aperture.

It is noted for the sake of completeness that the lower peak intensity produced by the doughnut lens 300 compared to the doughnut lens 200 can be explained by the fact that in the doughnut lens 300 the SSL elements 20 are located further away from the centre of the lens, which is known per se to reduce the collimation efficiency of a doughnut lens.

The doughnut lenses in the lighting device 1 according to embodiments of the present invention such as the doughnut lenses 200 and 300 may be made of any suitable material. Any material may be used that has a refractive index such that the inner region 110 and the outer region 130 of the lens exhibit reflective behaviour and the intermediate region 120 exhibits refractive behaviour. A polymer having favourable optical properties may be particularly suitable, as it allows for a straightforward manufacturing of the doughnut lenses 200 and 300, e.g. by moulding. Non-limiting examples of suitable polymers include PC, PMMA and PET although other examples will be apparent to the skilled person.

In an embodiment, the lighting device 1 may be a light bulb. The shape and size of the light bulb is not particularly limited and any suitable shape and size may be contemplated. Non-limiting examples of such suitable sizes include MR11, MR16, GU4, GU5.3, GU6.35, GU10, AR111, Par20, Par30, Par38, BR30, BR40, R20, R50 light bulbs and so on. Such a lighting device benefits from producing a luminous output having increased collimation, as has been demonstrated with the aid of the simulations presented in FIGS. 10 and 11.

Such a lighting device may be advantageously integrated into a luminaire to provide a luminaire benefiting from being able to produce a luminous output having increased collimation. Any suitable type of luminaire may be contemplated, such as a ceiling down lighter, an armature, a freestanding luminaire, an electronic device including a lighting device, e.g. a cooker hood, fridge, microwave oven, and so on.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A lighting device including:
   a lens comprising an annular collimating structure having a central axis of symmetry, said structure comprising a light exit surface and an intermediate region in between an inner region proximal to said axis and an outer region distal to said axis, wherein one of the inner region and outer region consists of a single prism extending from the light exit surface by a first height and the other of the inner region and outer region comprises a plurality of prisms extending from the light exit surface by a maximum second height, wherein the first height is at least the maximum second height and the intermediate region has an intermediate region surface separated from the light exit surface by a maximum further height that is smaller than the first height; and
   a plurality of solid state lighting elements arranged in a circular pattern on a carrier surface such that the solid state lighting elements are aligned with and facing the intermediate region surface, wherein the plurality of solid state lighting elements is placed within or close to a cavity defined by the single prism and/or the plurality of prims; and
   wherein the annular collimating structure is made of a material having a refractive index such that the intermediate region is a refractive region and the single prism and the plurality of prisms each reflect light emitted by the solid state lighting elements towards the light exit surface.

2. The lighting device of claim 1, wherein the solid state lighting elements are spaced from the light exit surface by a distance not exceeding the first height.

3. The lighting device of claim 1, wherein the single prism has a first surface portion arranged to receive light emitted by the solid state lighting elements and a second curved surface portion arranged to reflect light received by the first surface portion towards the light exit surface.

4. The lighting device of claim 3, wherein the second curved surface portion is shaped such that at least 50% of the light received by the first surface portion is reflected towards the light exit surface.

5. The lighting device of claim 1, wherein each of the plurality of prisms comprises a first surface portion arranged to receive light emitted by the solid state lighting elements and a second surface portion arranged to reflect light received by the first surface portion towards the light exit surface.

6. The lighting device of claim 1, wherein the prisms of said plurality are increasing in height in a direction away from the circular pattern of solid state elements such that the prism distal to said circular pattern has said maximum second height.

7. The lighting device of claim 1, wherein the intermediate region surface is a convex surface.

8. The lighting device of claim 1, wherein the inner region consists of the single prism.

9. The lighting device of claim 1, wherein the outer region consists of the single prism.

10. The lighting device of claim 1, wherein the single prism and the plurality of prisms are total internal reflection prisms.

11. The lighting device of claim 1, wherein the material is a polymer material.

12. The lighting device of claim 11, wherein the polymer material is selected from polycarbonate, poly (methyl methacrylate) and polyethylene terephthalate.

13. The lighting device of claim 1, wherein the light exit surface includes beam shaping elements.

14. The lighting device of claim 1, wherein the lighting device is a light bulb.

15. A luminaire comprising the lighting device of claim 1.

* * * * *